United States Patent
Stratz et al.

(10) Patent No.: US 11,241,995 B2
(45) Date of Patent: Feb. 8, 2022

(54) METHOD AND CONTROL UNIT FOR ADJUSTING A LIGHT LEVEL OF AT LEAST ONE HEADLAMP OF A VEHICLE

(71) Applicant: Robert Bosch GmbH, Stuttgart (DE)

(72) Inventors: Florian Stratz, Hemmingen (DE); Ralph Goll, Hemmingen (DE); Thomas Matschke, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 16/672,968

(22) Filed: Nov. 4, 2019

(65) Prior Publication Data

US 2020/0156527 A1    May 21, 2020

(30) Foreign Application Priority Data

Nov. 15, 2018    (DE) .......................... 102018219604.4

(51) Int. Cl.
*B60Q 1/08* (2006.01)
*F21S 41/657* (2018.01)
*B60Q 1/18* (2006.01)

(52) U.S. Cl.
CPC .............. *B60Q 1/08* (2013.01); *B60Q 1/085* (2013.01); *F21S 41/657* (2018.01); *B60Q 2300/14* (2013.01); *B60Q 2300/324* (2013.01)

(58) Field of Classification Search
CPC .... B60Q 2300/112; B60Q 1/085; B60Q 1/18; B60Q 2300/054; B60Q 2300/335;
(Continued)

(56) References Cited

U.S. PATENT DOCUMENTS

2008/0192496 A1* 8/2008 Mochizuki ............ F21S 41/689
362/466
2013/0177202 A1* 7/2013 Dierks ................. G06K 9/3241
382/103
(Continued)

FOREIGN PATENT DOCUMENTS

| DE | 102009045321 A1 | 4/2011 |
| DE | 102010040650 A1 | 3/2012 |
| DE | 102012020410 A1 | 10/2013 |

*Primary Examiner* — Wei (Victor) Y Chan
(74) *Attorney, Agent, or Firm* — Norton Rose Fulbright US LLP; Gerard Messina (57) ABSTRACT

A method for adjusting a light-level of at least one headlamp for a vehicle. The method includes a reading in; a determining; an ascertaining; and a providing. In the reading in, a position-signal is read in, which represents the current-position of the vehicle. In the determining, a topography-signal is determined using the position-signal, which represents a stored item of information about a roadway-topography at the current position, especially in the case of a curvature and/or a drop of a roadway. In the ascertaining, an angle of inclination of the headlamp to be adjusted for the optimal illumination of the roadway in front of the vehicle is ascertained using the topography-signal. In the providing, an actuating-signal is provided for an adjustment mechanism of the headlamp using the ascertained-angle of inclination to tilt the headlamp to the ascertained-angle of inclination so that the light level of the headlamp is adjustable.

11 Claims, 4 Drawing Sheets

(58) Field of Classification Search
CPC ...... B60Q 2300/336; B60Q 1/12; B60Q 1/16; B60Q 2300/122; B60Q 2300/134
See application file for complete search history.

(56) References Cited

U.S. PATENT DOCUMENTS

| | | | |
|---|---|---|---|
| 2015/0073654 A1* | 3/2015 | Foltin | B60Q 1/085 701/36 |
| 2015/0239391 A1* | 8/2015 | Foltin | G01B 11/303 701/49 |
| 2017/0203682 A1* | 7/2017 | Atsmon | B60Q 1/085 |
| 2018/0345964 A1* | 12/2018 | Fujii | B60W 50/14 |

* cited by examiner

METHOD AND CONTROL UNIT FOR ADJUSTING A LIGHT LEVEL OF AT LEAST ONE HEADLAMP OF A VEHICLE

RELATED APPLICATION INFORMATION

The present application claims priority to and the benefit of German patent application no. DE 10 2018 219 604.4, which was filed in Germany on Nov. 15, 2018, the disclosure of which is incorporated herein by reference.

FIELD OF THE INVENTION

The present invention is based on a method and a control unit for adjusting a light level of at least one headlamp in a vehicle. A computer program is also a subject matter of the present invention.

BACKGROUND INFORMATION

Patent document DE 10 2009 045321 A1 discusses a method and a device for regulating the light level of a vehicle headlamp.

SUMMARY OF THE INVENTION

Against this background, the approach presented here introduces an improved method for adjusting a light level of at least one headlamp of a vehicle; it also provides a control unit that uses this method and finally, a corresponding computer program according to the main claims. The measures mentioned in the dependent claims allow for advantageous further developments and improvements of the device indicated in the independent claim.

The method for adjusting a light level of at least one headlamp of a vehicle provides a possibility for reducing the risk of an accident caused by glare or by an insufficient illumination of a roadway, especially when the roadway does not extend horizontally.

A method is therefore introduced for adjusting a light level of at least one headlamp of a vehicle, the method having a step of reading in, a step of determining, a step of ascertaining, and a step of providing. In the step of reading in, a position signal is read in that represents the current position of the vehicle. In the step of determining, a topography signal, which represents a saved or stored item of information about a road topography at the current position, especially in the case of a curvature and/or a drop of a roadway, is determined with the aid of the position signal. In the step of ascertaining, an angle of inclination of the headlamp to be adjusted for the optimal illumination of the roadway in front of the vehicle is ascertained using the topography signal. In the step of providing, an actuating signal for an adjustment mechanism of the headlamp is provided using the ascertained angle of inclination in order to tilt the headlamp to the ascertained angle of inclination so that the light level of the headlamp may adjusted.

A light level may be understood as a beam direction of the headlamp of a vehicle. The vehicle, for example, may be used for transporting goods and/or persons. A topography signal may describe a signal that represents a roadway topography. In addition to a condition of a roadway, this roadway topography, for instance, may also denote a roadway course such as a vertical change in the roadway. The roadway could be a street, for example. For example, the roadway topography is able to be saved or stored in a memory such as a digital memory. A vertical change may also be denoted as a curvature or drop. A curvature, for example, may be a crest of a hill or a dip of the roadway. A drop represents a change in altitude in that the roadway rises or drops from an initial altitude to another altitude, for instance. The angle of inclination denotes an angle that is measured from the lower headlamp edge facing the roadway, for example, to an axis extending vertical to the roadway. The adjustment mechanism is developed to tilt the headlamp motorically in order to lower the illumination direction of the headlamp in the direction of the roadway, for instance. The present method advantageously prevents oncoming traffic from being exposed to glare.

According to one specific embodiment of the present method, in the step of reading in the position signal, a position of the vehicle detected with the aid of a satellite navigation system is able to be read in. The satellite navigation system, for instance, may be realized as a GPS, GALILEO, GLONASS system or the like. A passenger is advantageously able to be informed of his current location in a very precise manner using any widely available arrangement/apparatus.

According to one specific embodiment, in the step of reading in, a speed signal, which represents the current driving speed of the vehicle, is able to be read in, and in the step of providing, the actuating signal is provided using the speed signal. In an advantageous manner, this allows for rapid adaptations of the light level, for instance when the vehicle is approaching a dip in the road at a high speed.

According to one embodiment, in the step of providing, the actuating signal may be provided in such a way that the adjustment mechanism inclines the headlamp more rapidly at a high speed than at a low speed. This means that the faster the vehicle is traveling, the faster the light level of the headlamp will be adjusted. Conversely, the adjustment mechanism adjusts the light level more slowly when the vehicle is traveling at a lower speed. The risk of an accident is advantageously able to be reduced.

According to one embodiment, in the step of determining the topography signal, the information about the roadway topography is able to be obtained from a digital map. The digital map may be stored in a navigation system, for instance. This advantageously makes it possible to distinguish, or read out, different road types or terrain topographies, for example, using an arrangement/apparatus that may be already available on board.

According to one embodiment, in the step of providing an actuating signal, the actuating signal is able to be provided in such a way that a beam direction of the headlamp is able to be lowered in relation to the roadway in the case of a crest and/or a positive drop. The crest, for instance, may be the crest of a hill. The positive drop represents a change in altitude of the roadway from an initial altitude to a lower altitude. In this way a light level generated by the headlamp advantageously falls on the roadway so that glare for the oncoming traffic will be minimized.

Also advantageous is an embodiment in which in the step of providing an actuating signal, a beam direction of the headlamp is raised in the direction of the roadway in the case of a dip and/or a negative drop. The dip may be a depression in the roadway, for instance. The negative drop represents a change in altitude of the roadway from an initial altitude to a higher altitude. The light level thereby advantageously falls on the roadway such that a region in front of the vehicle is sufficiently illuminated, which reduces the risk of an accident.

For example, this method may be implemented in software or hardware or in a mixed form of software and hardware such as in a control unit.

Moreover, the introduced approach provides a control unit which is developed to carry out, actuate and/or implement the steps of a variant of a method introduced here in corresponding devices. This variant of an embodiment of the present invention in the form of a control unit is also able to achieve the objective on which the present invention is based in a rapid and efficient manner.

For this purpose, the control unit may include at least one processing unit for processing signals or data, at least one memory unit for storing signals or data, at least one interface to a sensor or an adjustment mechanism for reading in sensor signals from the sensor or for outputting control signals to the adjustment mechanism, and/or at least one communications interface for reading in or outputting data which are embedded in a communications protocol. For instance, the processing unit may be a signal processor, a microcontroller or the like, and the memory unit may be a flash memory, an EEPROM or a magnetic memory unit. The communications interface may be developed to read in or output data in a wireless and/or wire-conducted manner, and a communications interface that is able to read in or output wire-conducted data may read in these data, for instance electrically or optically, from a corresponding data transmission line or output the data to a corresponding data transmission line.

In the present case, a control unit may be understood as an electrical device which processes sensor signals and outputs control and/or data signals as a function thereof. The control unit may have an interface that could be developed in hardware and/or software. In a hardware development, the interfaces may be part of what is known as a system ASIC, for instance, which encompasses a wide variety of functions of the control unit. However, it is also possible for the interfaces to be discrete, integrated switching circuits or to be at least partially made up of discrete components. In a software development, the interfaces may be software modules that are provided on a microcontroller in addition to other software modules, for example.

Also advantageous is a computer program product or a computer program having program code, which may be stored on a machine-readable carrier or memory medium such as a semiconductor memory, a hard disk memory or an optical memory and used to execute, implement and/or actuate the steps of the present method according to the afore-described embodiments, in particular when the program product or program is executed on a computer or a device.

Exemplary embodiments of the presented approach are illustrated in the drawing and described in greater detail in the following specification.

In the following description of advantageous exemplary embodiments of the present invention, the same or similar reference numerals are used for similarly acting elements shown in the figures, and a repeated description of these elements has been omitted.

DETAILED DESCRIPTION

Figure 1:
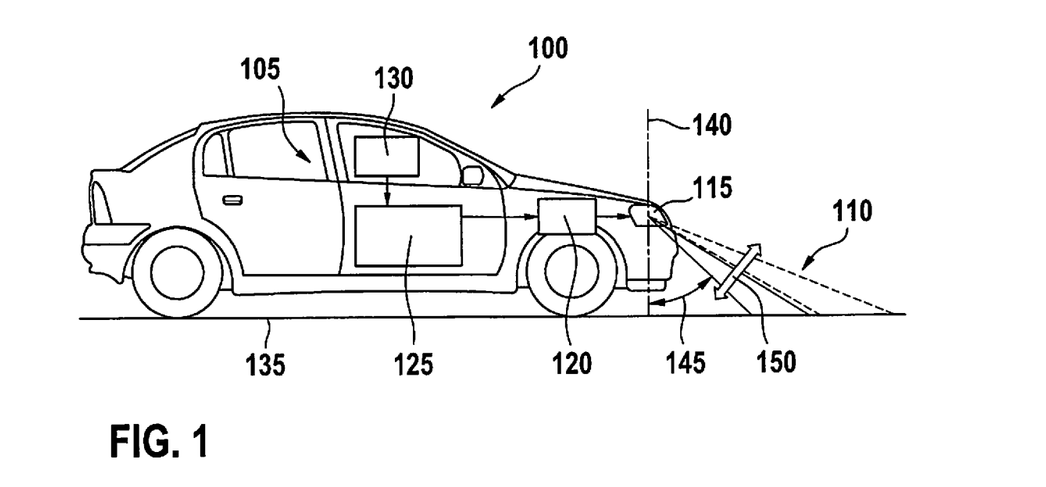
FIG. 1 shows a perspective view of a vehicle according to an exemplary embodiment.

FIG. 1 shows a perspective view of a vehicle 100 which uses the introduced approach according to an exemplary embodiment.

Vehicle 100, for example, is developed to transport persons and/or goods and for using a method 105 for adjusting a light level 110 of at least one headlamp 115 of vehicle 100. In addition to headlamp 115, vehicle 100 includes an adjustment mechanism 120, a control unit 125 and a receiving unit 130 for signals from a satellite navigation system, in order to enable it to able to apply method 105. According to one exemplary embodiment, vehicle 100 includes an automatic system for regulating the light level so that the driver of vehicle 100 does not have to adjust light level 110 in a manual manner. Headlamp 115 is developed to illuminate a roadway 135 in the driving direction. Adjustment mechanism 120 is developed to tilt headlamp 115. Control unit 125 is developed to induce the tilting of headlamp 115. Receiving unit 130 for signals from the satellite navigation system is developed to detect a position of vehicle 100.

According to one exemplary embodiment, light level 110 is adjusted by tilting headlamp 115 (e.g., about a transverse axis). Light level 110 may also be referred to as the beam direction, for example. According to an exemplary embodiment, light level 110 is adjusted to an angle of inclination 145, which—starting from an axis 140 aligned perpendicular to roadway 135—extends in the direction of roadway 135. According to an exemplary embodiment of the presented approach, roadway 135 is optimally illuminated because of adjusted angle of inclination 145, thereby preventing oncoming traffic from being exposed to glare at the same time. Illustrated directional arrow 150 indicates the direction in which headlamp 115 may be tilted.

In other words, in automatic systems for a light level control (LLC), quasi-static and dynamic LLC systems may be distinguished. The quasi-static LLC corrects only changes in inclination caused by changes in the loading condition. In vehicles 100 that are equipped with xenon headlamps, for example, virtually only dynamic LCC systems are currently in existence, which also react to vehicle-related changes in inclination, e.g., an acceleration and braking. For the sake of completeness, the manual LRR systems should be mentioned as well. However, in such cases, the driver himself should adjust the headlamp inclination using a switch. The currently installed automatic light level control systems have the disadvantage that they do not take the roadway topography into account when adjusting light level 110. As a result, even in the case of vehicles that are equipped with a dynamic LLC, oncoming traffic will be exposed to glare on crests, or light level 110 is provided too low in the case of dips in the road. Both scenarios pose a risk (exposing oncoming traffic to glare and insufficient illumination of roadway 135). A topographical light leveling control offers a remedy. The topography data (e.g., a curvature or a drop) of the driving route are often already stored in the map material of the navigation system. Via GPS, as just one example of an item of positional information from a satellite navigation system, vehicle 100 has knowledge of its current position, and thus also of the topography of roadway 135. Using these data, a topographical light level control function is able to optimally align the inclination of headlamps 115 with the topography of the roadway.

Figure 2:
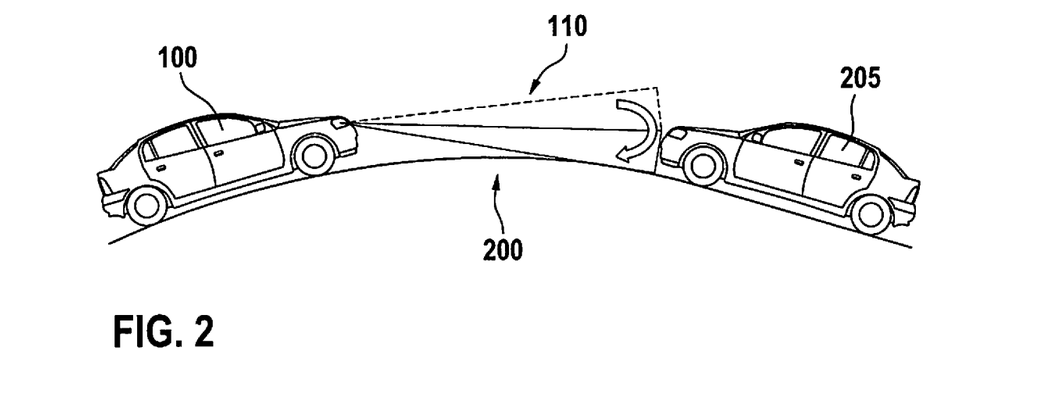
FIG. 2 shows a perspective view of the vehicle and a light level of a headlamp on a crest featuring oncoming traffic, an exemplary embodiment of the approach presented here being used in the vehicle.

FIG. 2 shows a perspective view of vehicle 100 and a light level 145 of a headlamp on a crest 200 where oncoming traffic 205 is encountered and an exemplary embodiment of the introduced approach is used in vehicle 100. Vehicle 100 corresponds to vehicle 100 described in FIG. 1. According to this exemplary embodiment, vehicle 100 drives toward a crest 200. This means that the roadway has a convex curvature. In order to minimize glare for oncoming traffic 205, an adjustment of light level 110 is required. According to one exemplary embodiment, the headlamp is inclined.

In other words, the car drives over a crest 200. The convex curvature of the roadway is taken into account in the topographical light level control system, and the dangerous exposure of oncoming traffic 205 to glare is prevented by the inclination of the headlamps.

Figure 3:
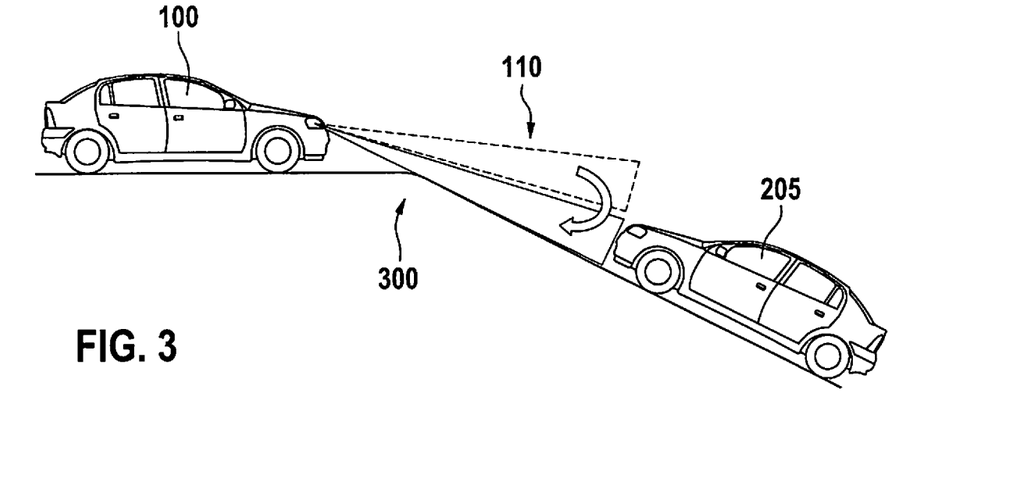
FIG. 3 shows a perspective view of the vehicle and a light level of a headlamp in the presence of a positive drop of the roadway featuring oncoming traffic, an exemplary embodiment of the approach presented here being used in the vehicle.

FIG. 3 shows a perspective view of vehicle 100 and a light level 110 of a headlamp 115 in the presence of a positive drop 300 of the roadway featuring oncoming traffic 205, an exemplary embodiment of the introduced approach being used in vehicle 100. Vehicle 100 may correspond to the vehicle described in FIG. 1. A positive drop 300 represents a change in altitude of the roadway from an initial altitude to a lower altitude. This creates a similar effect as when vehicle 100 is driving over a crest, so that light level 110 is inclined in the direction of the roadway, as is also the case in FIG. 2.

In other words, the car travels over a positive drop. The positive drop 300 of the roadway is taken into account in the topographical light level control system, and the dangerous exposure of oncoming traffic 205 to glare is prevented by the inclination of the headlamps.

Figure 4:
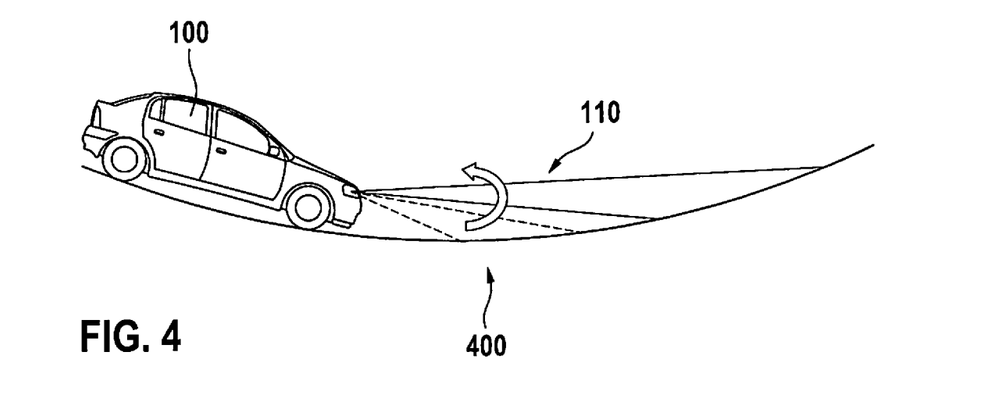
FIG. 4 shows a perspective view of the vehicle and a light level of a headlamp in the presence of a dip in the roadway, an exemplary embodiment of the approach presented here being used in the vehicle.

FIG. 4 shows a perspective view of vehicle 100 and a light level 110 of a headlamp 115 in the presence of a dip 400 in the roadway, an exemplary embodiment of the introduced approach being used in vehicle 100. Vehicle 100 may correspond to the vehicle described in FIG. 1. According to this exemplary embodiment, vehicle 100 drives through a dip 400 of the roadway. This means that the roadway has a concave curvature. In order to obtain a sufficient illumination of the roadway, light level 110 is raised.

In other words, when driving in a dip 400 in the roadway, the concave curvature is taken into account, and the inclination of the headlamps is raised so that a sufficient illumination of the roadway is ensured.

Figure 5:
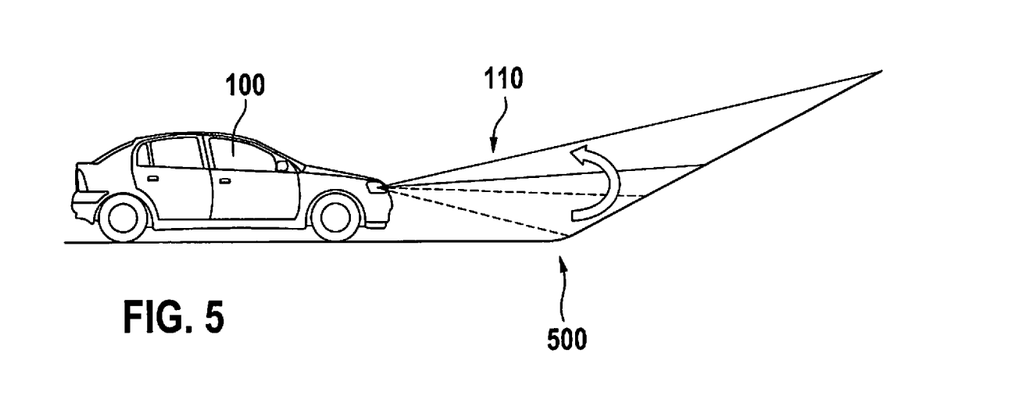
FIG. 5 shows a perspective view of the vehicle and a light level of a headlamp in the presence of a negative drop of the roadway, an exemplary embodiment of the approach presented here being used in the vehicle.

FIG. 5 shows a perspective view of vehicle 100 and a light level 110 of a headlamp in the presence of a negative drop 500 of the roadway, an exemplary embodiment of the introduced approach being used in vehicle 100. Vehicle 100 may correspond to the vehicle described in FIG. 1. A negative drop 500 represents a change in altitude of the roadway from an initial altitude to a higher altitude. This creates a similar effect as when vehicle 100 drives through a dip in the roadway, so that light level 110 is raised in the direction of the roadway, as is also the case in FIG. 4.

Expressed in different terms, the car drives across a negative drop 500. Negative drop 500 of the roadway is taken into account by the topographical light level control system, and the inclination of the headlamps is raised so that sufficient illumination of the roadway is ensured.

Figure 6:
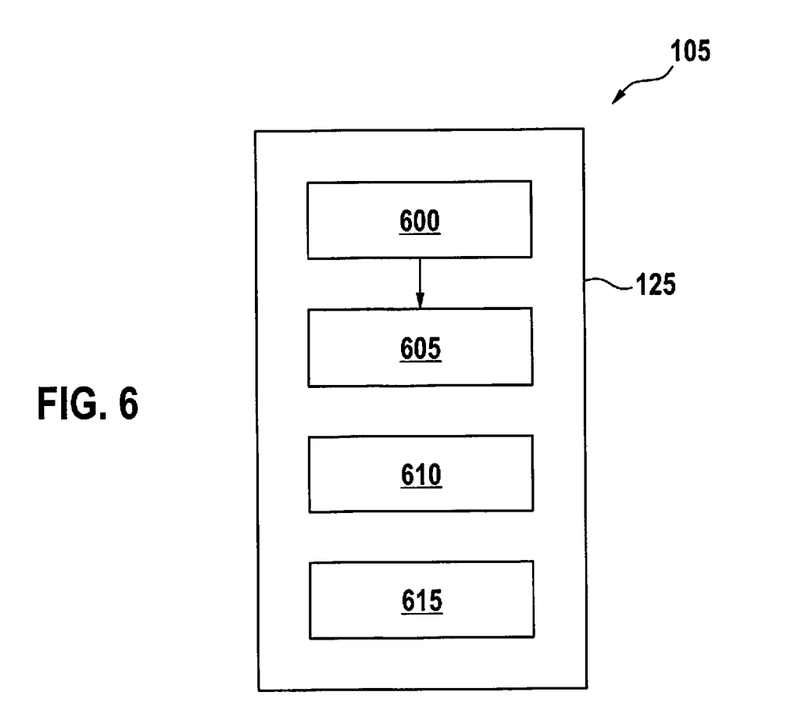
FIG. 6 shows a flow diagram of a method for adjusting a light level according to an exemplary embodiment.

FIG. 6 shows a flow diagram of a method 105 for adjusting a light level according to one exemplary embodiment. The method includes a step 600 of reading in, a step 605 of determining, a step 610 of ascertaining, as well as a step 615 of providing. In step 600 of reading in, a position signal, which represents the current position of the vehicle, is read in. In step 605 of determining, a topography signal is determined using the position signal, the topography signal representing a saved or stored item of information about a roadway topography at the current position. In step 610 of ascertaining, an angle of inclination of the headlamp to be adjusted for the optimal illumination of the roadway in front of the vehicle is ascertained using the topography signal. In step 615 of providing, an actuating signal for an adjustment mechanism of the headlamp is provided using the ascertained angle of inclination in order to tilt the headlamp to the ascertained angle of inclination so as to adjust the light level of the headlamp. According to one very advantageous exemplary embodiment, a speed signal that corresponds to the current driving speed is also read in in step 600 of reading in, and in step 610 of ascertaining, the angle of inclination to be adjusted is ascertained using the speed signal.

The steps 600, 605, 610, 615 of present method 105 are controlled by a control unit 125, which is developed to read in and/or supply signals. According to one exemplary embodiment, for example, it is therefore possible in method step 105 to use information about the topography of the roadway stored in a navigation device as well as the current position of the vehicle for aligning the headlamps of the vehicle in such a way that a danger potential by glare, for instance, is able to be avoided.

In other words, an optimal angle of inclination of the headlamps is ascertained in many cases in control unit 125, which may also be called an LLC computer, in that the current position and the roadway topography are compared and the optimal angle of inclination is made available as a corresponding input signal to the adjustment mechanism of the headlamps. The adjustment rate of the adjustment mechanism depends on a current driving speed, for instance. As already common in current LLC systems, the adjustment mechanism adjusts the calculated angle of inclination of the headlamps.

Via a corresponding receiving unit 130 of control unit 125, a satellite navigation system is able to provide the current position of the vehicle. The topographical data of the roadway, too, are stored in the map material. Using these two sources, control unit 125 is able to calculate the optimal inclination of the headlamps, and it specifies a corresponding signal to the adjustment mechanism or actuating element. The current speed represents the third relevant input variable for control unit 125. It defines the adjustment rate of the adjustment mechanism. The adjustment mechanism adjusts the inclination of the headlamps in order to obtain an optimal light level. The optimal light level is a function of the roadway topography.

Figure 7:
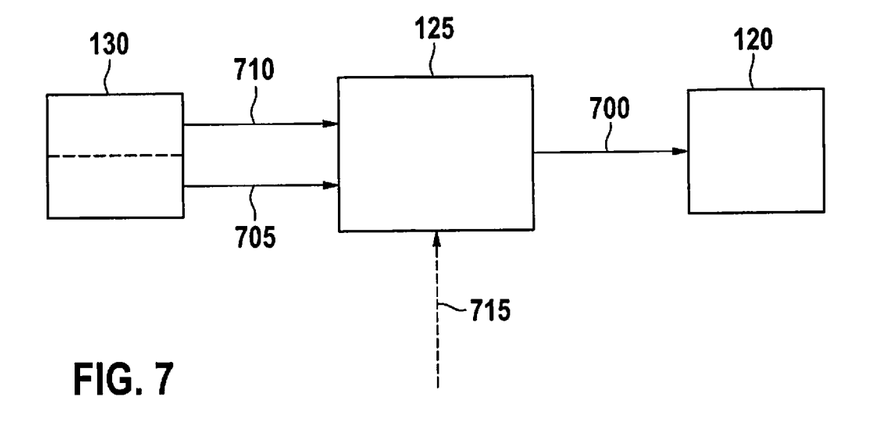
FIG. 7 shows a block diagram of a method for adjusting a light level according to an exemplary embodiment.

FIG. 7 shows a block diagram of the present method for adjusting a light level according to an exemplary embodiment. The block diagram represents control unit 125, a receiving unit 130 of the satellite navigation system, as well as adjustment mechanism 120. In addition, it shows a position signal 700, a topography signal 705 and also an actuating signal. Moreover, the block diagram shows a speed signal 715. The block diagram illustrates the sequence of the method described in FIG. 6. To begin with, control unit 125 reads in position signal 700 arriving from satellite navigation system 130. Position signal 700 represents the current position of the vehicle. Topography signal 705 is also received in control unit 125. It represents a stored item of information about a roadway topography, which, for instance, is stored in receiving unit 130 of the satellite navigation system or in the map material stored in the navigation system. Control unit 125 is developed to use position signal 700 and topography signal 705 for determining the roadway topography at the current location of the vehicle. Control unit 125 then calculates an angle of inclination to which a headlamp of the vehicle should be adjusted in order to optimally illuminate the roadway. To ascertain the angle of inclination, control unit 125 also considers topography signal 705. This allows control unit 125 to ascertain an angle of inclination of the headlamp that is optimal for the current position of the vehicle. According to one exemplary embodiment, control unit 125 additionally reads in speed signal 715, which represents the speed of the vehicle. Speed signal 715 is output by a measuring unit, for instance.

According to one exemplary embodiment, control unit 125 then supplies an actuating signal 710 for an adjustment mechanism of the headlamp so that the adjustment mechanism tilts the headlamp to the ascertained angle of inclination. This allows for an optimal adjustment of a light level of the headlamp while considering the roadway topography, and blinding of oncoming traffic by glare and/or an insufficient illumination of the roadway is/are prevented. Because of the reading in and incorporation of speed signal 715, the adjustment mechanism obtains additional information about the speed, for instance, via actuating signal 710, so that the adjustment mechanism tilts the headlamp more rapidly the faster the vehicle is driving and, conversely, tilts the headlamp at a slower rate the slower the vehicle is traveling.

If an exemplary embodiment includes an "and/or" linkage between a first feature and a second feature, then this should be read to denote that the exemplary embodiment according to one embodiment includes both the first feature and the second feature, and according to a further embodiment, includes either only the first feature or only the second feature.

What is claimed is:

1. A method for adjusting a light level of at least one headlamp of a vehicle, the method comprising:
    reading in a position signal that represents the current position of the vehicle;
    determining a topography signal using the position signal, which represents a saved or stored item of information about a roadway topography at the current position, including in the case of a curvature and/or a drop of a roadway;
    ascertaining an angle of inclination of the headlamp to be adjusted for providing optimal illumination of the roadway in front of the vehicle using the topography signal; and
    providing an actuating signal for an adjustment mechanism of the headlamp using the ascertained angle of inclination to tilt the headlamp to the ascertained angle of inclination so that the light level of the headlamp is adjustable;
    wherein the vehicle includes the adjustment mechanism, a control unit and a receiving unit for signals from a satellite navigation system,
    wherein the vehicle includes an automatic system for automatically regulating the light level so that the driver of vehicle does not have to adjust the light level in a manual manner,
    wherein the headlamp is configured to illuminate a roadway in a driving direction,
    wherein the adjustment mechanism is configured to tilt the headlamp, and the control unit is configured to induce the tilting of the headlamp,
    wherein the receiving unit is for receiving signals from a navigation system configured to detect the position of the vehicle,
    wherein the light level or beam direction is adjusted by tilting the headlamp about a transverse axis, so that the light level is adjustable to an angle of inclination, which starting from an axis aligned perpendicularly to the roadway extends in the direction of the roadway,
    wherein the roadway is optimally illuminated because of an adjusted angle of inclination so as to prevent oncoming traffic from being exposed to glare at a same time, and
    wherein an optimal angle of inclination of the headlamps is ascertained in the control unit or a light-level control (LLC) computer, in that the current position and the roadway topography are compared and the optimal angle of inclination is made available as a corresponding input signal to the adjustment mechanism of the headlamps, wherein the adjustment rate of the adjustment mechanism depends on a current driving speed, and wherein the adjustment mechanism adjusts the calculated angle of inclination of the headlamps.

2. The method of claim 1, wherein a position of the vehicle detected with a satellite navigation system is read in.

3. The method of claim 1, wherein a speed signal which represents the current driving speed of the vehicle is read in, and in the providing, the actuating signal is provided using the speed signal.

4. The method of claim 3, wherein the actuating signal is provided so that the adjustment mechanism inclines the headlamp more rapidly at a high driving speed than at a low driving speed.

5. The method of claim 1, wherein the information about the roadway topography is obtained from a digital map.

6. The method of claim 1, wherein the actuating signal is provided so that a beam direction of the headlamp is lowered in the direction of the roadway in the case of a crest and/or a positive drop.

7. The method of claim 1, wherein the actuating signal is provided so that a beam direction of the headlamp is raised with respect to the roadway in the case of a dip and/or a negative drop.

8. A control unit for adjusting a light level of at least one headlamp of a vehicle, comprising:
    a controller configured to perform the following:
        reading in a position signal that represents the current position of the vehicle;
        determining a topography signal using the position signal, which represents a saved or stored item of information about a roadway topography at the current position, including in the case of a curvature and/or a drop of a roadway;
        ascertaining an angle of inclination of the headlamp to be adjusted for providing optimal illumination of the roadway in front of the vehicle using the topography signal; and
        providing an actuating signal for an adjustment mechanism of the headlamp using the ascertained angle of inclination to tilt the headlamp to the ascertained angle of inclination so that the light level of the headlamp is adjustable;

wherein the vehicle includes the adjustment mechanism, a control unit and a receiving unit for signals from a satellite navigation system, wherein the vehicle includes an automatic system for automatically regulating the light level so that the driver of vehicle does not have to adjust the light level in a manual manner, wherein the headlamp is configured to illuminate a roadway in a driving direction, wherein the adjustment mechanism is configured to tilt the headlamp, and the control unit is configured to induce the tilting of the headlamp, wherein the receiving unit is for receiving signals from a navigation system configured to detect the position of the vehicle, wherein the light level or beam direction is adjusted by tilting the headlamp about a transverse axis, so that the light level is adjustable to an angle of inclination, which starting from an axis aligned perpendicularly to the roadway extends in the direction of the roadway, wherein the roadway is optimally illuminated because of an adjusted angle of inclination so as to prevent oncoming traffic from being exposed to glare at a same time, and wherein an optimal angle of inclination of the headlamps is ascertained in the control unit or a light-level control (LLC) computer, in that the current position and the roadway topography are compared and the optimal angle of inclination is made available as a corresponding input signal to the adjustment mechanism of the headlamps, wherein the adjustment rate of the adjustment mechanism depends on a current driving speed, and wherein the adjustment mechanism adjusts the calculated angle of inclination of the headlamps.

9. A non-transitory computer readable medium having a computer program, which is executable by a processor, comprising:

a program code arrangement having program code for adjusting a light level of at least one headlamp of a vehicle, by performing the following:

reading in a position signal that represents the current position of the vehicle;

determining a topography signal using the position signal, which represents a saved or stored item of information about a roadway topography at the current position, including in the case of a curvature and/or a drop of a roadway;

ascertaining an angle of inclination of the headlamp to be adjusted for providing optimal illumination of the roadway in front of the vehicle using the topography signal; and providing an actuating signal for an adjustment mechanism of the headlamp using the ascertained angle of inclination to tilt the headlamp to the ascertained angle of inclination so that the light level of the headlamp is adjustable;

wherein the vehicle includes the adjustment mechanism, a control unit and a receiving unit for signals from a satellite navigation system, wherein the vehicle includes an automatic system for automatically regulating the light level so that the driver of vehicle does not have to adjust the light level in a manual manner, wherein the headlamp is configured to illuminate a roadway in a driving direction, wherein the adjustment mechanism is configured to tilt the headlamp, and the control unit is configured to induce the tilting of the headlamp, wherein the receiving unit is for receiving signals from a navigation system configured to detect the position of the vehicle, wherein the light level or beam direction is adjusted by tilting the headlamp about a transverse axis, so that the light level is adjustable to an angle of inclination, which starting from an axis aligned perpendicularly to the roadway extends in the direction of the roadway, wherein the roadway is optimally illuminated because of an adjusted angle of inclination so as to prevent oncoming traffic from being exposed to glare at a same time, and wherein an optimal angle of inclination of the headlamps is ascertained in the control unit or a light-level control (LLC) computer, in that the current position and the roadway topography are compared and the optimal angle of inclination is made available as a corresponding input signal to the adjustment mechanism of the headlamps, wherein the adjustment rate of the adjustment mechanism depends on a current driving speed, and wherein the adjustment mechanism adjusts the calculated angle of inclination of the headlamps.

10. The computer readable medium of claim 9, wherein a speed signal which represents the current driving speed of the vehicle is read in, and in the providing, the actuating signal is provided using the speed signal.

11. The computer readable medium of claim 10, wherein the actuating signal is provided so that the adjustment mechanism inclines the headlamp more rapidly at a high driving speed than at a low driving speed.

* * * * *